Patented Feb. 13, 1940

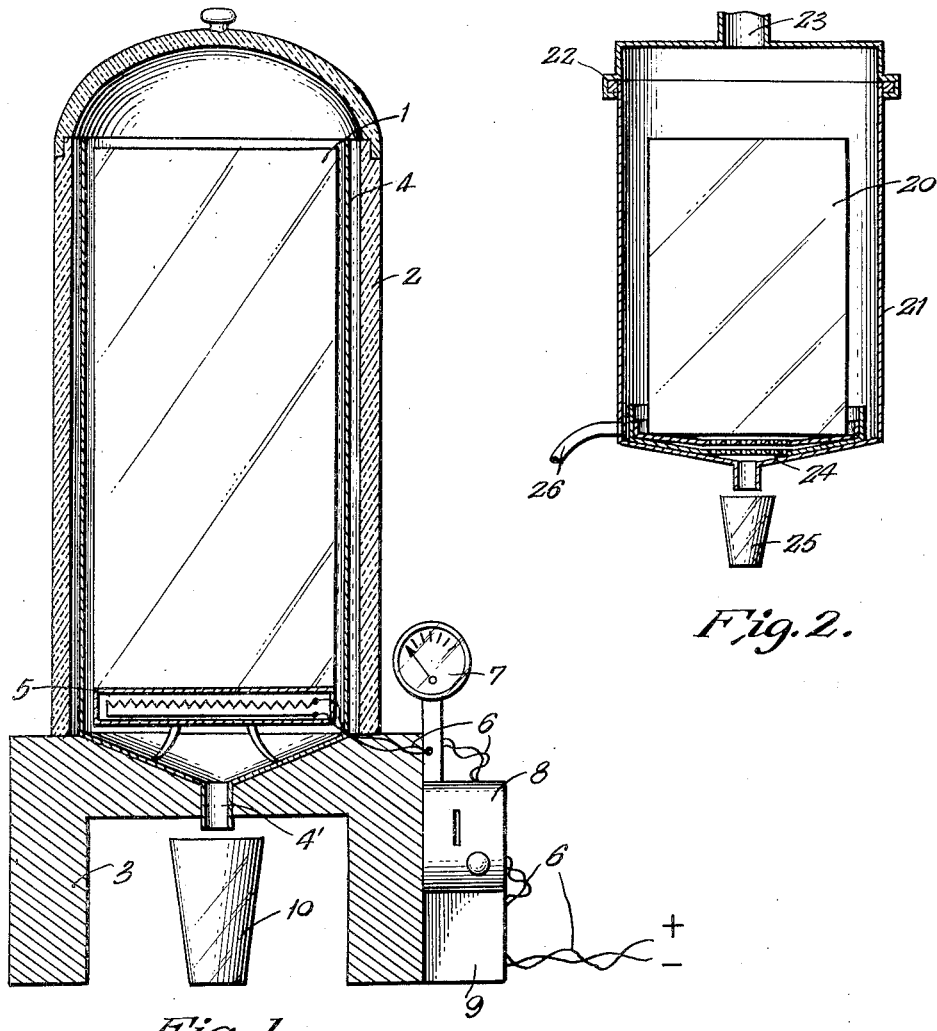

2,190,084

UNITED STATES PATENT OFFICE 2,190,084

METHOD OF DISPENSING COLD DRINKS

Peter Schlumbohm, New York, N. Y.

Application June 22, 1937, Serial No. 149,724
In Germany June 22, 1936

7 Claims. (Cl. 225—21)

The invention relates to a method of dispensing cold drinks. More specifically, the invention offers a solution of the problem of dispensing a desired volume of a cold drink from a frozen mass of the drink.

It is not new to freeze a beverage, juices, milk or the like at the place of production, to ship them as a frozen mass to the place of consumption and to melt there the frozen drink by application of heat. The problem of dispensing a desired small volume, e. g., to fill a single drinking glass, directly from the frozen phase was solved by providing a subdivision of the frozen mass prior to its melting, e. g., by providing small frozen cubes or cakes adapted to make a single glass of liquid. This known method thus applies the old principles of dispensing a desired volume of liquid by measuring the volume or the weight.

Following the invention, a desired volume of a cold drink is dispensed from a frozen mass of the drink by applying a predetermined amount of heat to the frozen mass. Thus, based on the latent heat of the frozen mass, a relation between the calories of the heat and the volume of the melted mass serves to dispense a desired volume of the drink.

Following the invention, the frozen mass of the drink is stored in a walled space, which is heat-insulated and which may even be equipped with refrigerating means to absorb all inraying heat, and a measured amount of heat is conducted into said walled space and applied to the frozen mass.

The invention is illustrated in the accompanying drawing by way of example. Fig. 1 illustrates the application of electricity as source of heat and the installation of a coin-operated time switch for measuring the electricity. Fig. 2 shows the application of steam for melting the ice.

As shown in Fig. 1, the frozen mass of the drink 1 is stored within the insulated container 2, mounted on a base 3. A heatable grill 5 within a tube 4 is the base for the frozen block 1. The lower part 4' of tube 4 forms a funnel through which the melted drink may flow into a drinking glass 10. The electrical wire 6 of the grill 5 is part of the electrical equipment, which comprises a slot machine mechanism 8, a time switch 7, a watt-regulator 9, and which may be supplemented by other standard equipment serving slot-machine purposes.

Dropping a coin into the slot will release a predetermined amount of watt seconds and will result in filling the drinking glass 10 with a predetermined amount of the liquid drink.

The latent heat of ice being 80 kcal., and the kilowatt-hour rendering 860 kcal., almost 11 kg. of ice can be melted at the costs of 1 kilowatt hour, which will not be higher than 5 cts. With approximately 50 drinks resulting from those 11 kg. of ice, the melting costs per drink of 200 ccm. would be about 0.1 cent, and I visualize that with my new method it should be possible to dispense a glass of ice water at the price of one cent.

The application of steam for melting the frozen drink, as illustrated in Fig. 2, will also be based on measuring the amount of steam, which enters through tube 23 into the melting chamber 21, in which the frozen mass of the drink 20 is stored. Steam measuring devices are well known in many varieties. The simplest way would be to provide a valve in line 23 which opens with time switch control for a predetermined length of time. The amount of steam which condenses at the walls of storage chamber 21 must be allowed for as an empirical factor. Following the invention, means are provided to drain this amount of condensed steam from the walls of chamber 21 and a drain pipe 26, and to prevent it from flowing into the drinking glass 25. The glass 25 is filled exclusively with liquid passing through the sieve bottom 24 of the storage chamber 21, said liquid resulting from the melted ice and from the steam condensed on the surface of the ice.

1 kg. of steam with its condensation heat of approximately 600 kcal. could melt by condensation approximately 7.5 kg. of ice. Or, approximately 13 gr. of condensed steam join the melting water of 100 gr. of ice. For frozen juices, milk etc. these figures will vary slightly in accordance with the figures for the latent heat of those drinks. Such a degree of dilution, however, will be always tolerable.

The set-up of Fig. 2 will be especially practical for restaurants and coffee houses which are already equipped with steam coffee-maker installations.

Having now described the nature of my invention and indicated by way of examples the manner in which it may be performed, what I claim is:

1. The method of dispensing a predetermined volume of liquid, comprising the application of a predetermined amount of heat to a frozen mass of said liquid.

2. The method of dispensing a predetermined volume of liquid, comprising the application of a predetermined amount of electricity to a frozen mass of said liquid.

3. The method of dispensing a predetermined volume of liquid, comprising the condensation of a controlled amount of steam on the surface of a frozen mass of said liquid.

4. A dispensing apparatus for dispensing a predetermined volume of liquid by applying a predetermined amount of heat to a frozen mass of said liquid, comprising a heat-insulated container for storing the frozen mass, heating means in heat-exchange relation with said frozen mass, means to control the supply of heat to said heating means, and means to withdraw melted liquid from said frozen mass.

5. In an apparatus as claimed in claim 4, said control means comprising a time-switch for cutting-in and cutting-out electric current.

6. In a dispensing apparatus as claimed in claim 4, said control means comprising a coin-operated switch for cutting-in and cutting-out electric current.

7. A dispensing apparatus for liquids, comprising a melting chamber for a frozen mass of the liquid to be dispensed, a source of steam, connecting means between said source of steam and said melting chamber, means for holding said frozen mass within said melting chamber within a certain space, means for withdrawing from said certain space melted liquid and the condensed steam which caused the melting of said withdrawn liquid; and separate means for withdrawing such condensed steam which condensed at other surfaces than the surface of said frozen mass.

PETER SCHLUMBOHM.